Oct. 9, 1934.　　　　R. GRETSCHEL　　　　1,976,340
PLANT SPRAYING DEVICE
Filed Sept. 24, 1932
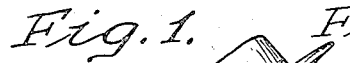
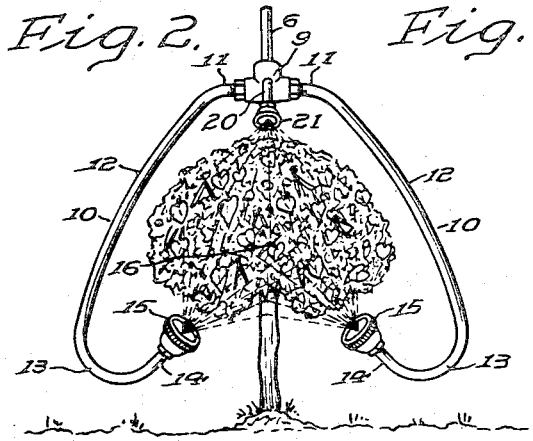
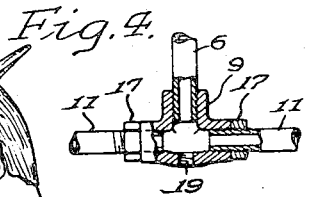
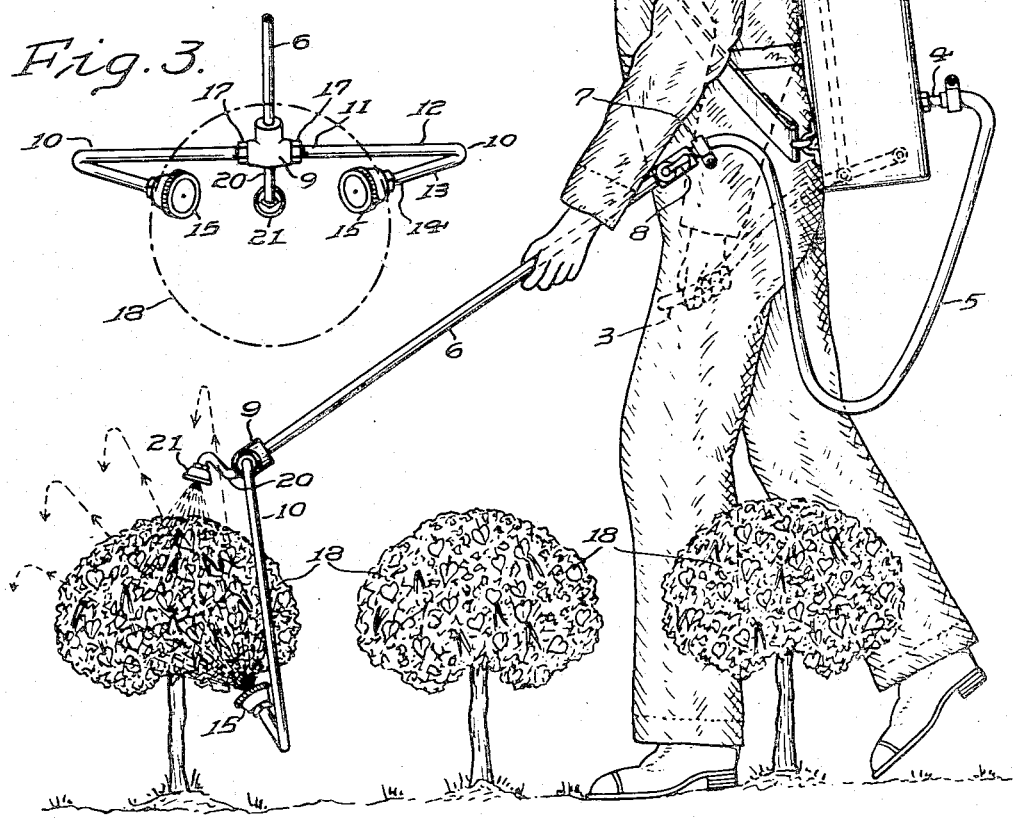
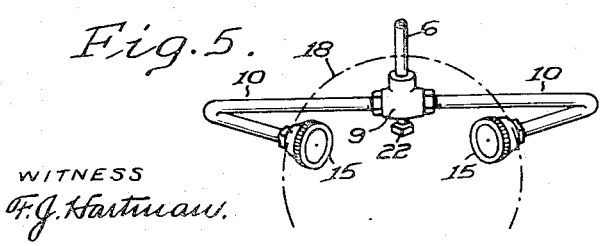
WITNESS
F. J. Hartman
INVENTOR
Rudolph Gretschel.
BY
ATTORNEY Patented Oct. 9, 1934

1,976,340

UNITED STATES PATENT OFFICE 1,976,340

PLANT SPRAYING DEVICE

Rudolph Gretschel, Fellowship, N. J.

Application September 24, 1932, Serial No. 634,656

5 Claims. (Cl. 299—111)

My invention relates to plant spraying devices, and more particularly has to do with devices especially adapted for applying insecticides to relatively low growing or young garden plants, such as bean and tomato plants, and the like, with the use of a portable apparatus involving a pressure reservoir secured to the back of the laborer, combined with a manipulated tubular device or implement provided with nozzles disposed in a particular manner and through which a liquid insecticide is sprayed against the leaves of the plant.

Heretofore it has been attempted to apply a liquid insecticide to plants of the character referred to, from a tube having a jet or nozzle projecting straight out from the end of it, but such devices merely spray the liquid downwardly over the plants, and the insecticide reaches and wets substantially only the top or upper surfaces of the leaves forming the foliage.

When, therefore, the pests with which the plants are infested are on the under or lower sides of the leaves or foliage, they are protected from the insecticide thus applied to the tops of the leaves in the usual way, and continue to thrive on the edible undersides of the leaves unless the operator, who is applying the spray to the plants, or his assistant, raises, with a stick or other suitable instrument, the various branches of the plant and thus holds it while the spray is being applied downwardly on the plant, thus giving the spray access to the underside of the foliage while the branches and leaves are being thus held inverted.

Such a treatment involving the turning over of each plant and perhaps of each branch of each plant, involves a great deal of time and only slow progress can be made. It is ineffectual to destroy the pests before the garden is ruined, particularly when the garden is sizable and the pests are such a character, and are in such hordes (Japanese beetles) that they destroy an entire garden in a day or two. To effectually use the ordinary spraying device, above referred to, would necessitate the employment of relatively large number of laborers equipped with spraying devices in order to adequately spray all the plants within the short time available for such treatment.

It is with these considerations, in mind, that the present invention has for its object the providing of a device which is easily portable, with which one hand of the operator is free to operate the pump to maintain the required pressure in the tank, and in which his other hand is free to direct the spray to apply the liquid insecticide to the underside of the foliage of the plant from the opposite sides of the plant through a pair of nozzles borne and held by the operator near the ground or base of the plant, and which are directed upwardly and preferably slightly forwardly.

A further object of the invention is to provide a device of the character above described for spraying the underside of the leaves of the foliage of the plant and a pair of sprayers borne near to the ground on opposite sides of the plant and directed upwardly and a little forwardly so that the spray or discharge therefrom meet at a focal region within the foliage of the plant.

A further object of the invention is to provide a device which will spray growing garden plants upwardly from a point near the ground to apply a liquid insecticide to the undersides of all the leaves, from two nozzles held below the plant and directed upwardly and through which the liquid insecticide is forced as a spray, the discharge from the nozzles on opposite sides of the plant converging upwardly and meeting in a focal region in the plant and thereafter being deflected by the impact and confluence of the streams upwardly above the plant for a short distance where, losing their velocity, the particles of insecticide fall back, rainlike, and come to rest on the upper surface of the leaves, thus in one operation efficiently applying the insecticide to the lower and to the upper sides of the leaves of the plant.

A further object of this invention is to apply upwardly against the undersides of a growing plant, a liquid insecticide as a spray, under a pressure sufficient to impel the material through the plant to a point a little above the top of the plant, at which point the material losing its upwardly velocity, falls back by gravity to the upper surface of the leaves of the plant.

A further object of this invention is to provide a tool or implement for applying a liquid insecticide to growing plants in such a manner that the liquid does not come into contact with the operator who is applying it, nor against his clothing, nor his hands nor his face, so that the operator is not likely to be injuriously or uncomfortably affected by the chemicals of which the insecticide is composed.

Larvæ and plant lice are more generally found on the undersides of the leaves, whereas other pests, such as the Japanese beetle particularly infest the upper sides of the leaves and the flowers, some of which may open upwardly and some downwardly. A further object of this invention is to provide a spraying implement to apply a liquid insecticide to a garden plant to reach both sides of the leaves and into the flowers of all garden and similar plants to destroy all insect pests.

Other objects of this invention will appear in the specification and claims below.

Referring now to the drawing forming a part of this specification and in which the same reference characters are employed throughout the various views to designate the same parts, Fig. 1 shows in side elevation, my improved implement carried by a laborer equipped with a pressure tank and employed in applying the liquid insecticide to a row of growing plants;

Fig. 2 is an elevational view of the front end of the spraying appliance showing the branched arrangement whereby the insecticide is conveyed to the upwardly directed nozzles on opposite sides of the plant in such a way as to drive the insecticide against the undersides of the leaves of the foliage;

Fig. 3 is a plan view of the forward end of my spraying device;

Fig. 4 is a cross-sectional view of the connections between the branches and the main stem or tube; and Fig. 5 illustrates a slightly modified construction.

In order to utilize my invention I preferably connect it with a standard tank or reservoir 1 adapted to be secured by straps 2 to the shoulders of a laborer in a well-known manner, such reservoir being usually provided on the inside with a pressure pump which is operated by a pump lever or handle 3 adapted to be oscillated vertically by the right hand of the laborer to produce the desired pressure on the liquid insecticide carried in the tank 1. The tank is usually provided with a nipple 4 to which is attached a length of flexible hose or tubing 5, adapted to be attached to a spraying device or tool or implement. The equipment thus far described is, per se, of standard and well-known construction.

My invention comprises the spraying implement adapted to be attached to the free end of the flexible hose or tubing 5 and consists essentially of a small stiff, preferably copper, tubing providing the main stem 6 which serves as a handle by means of which the implement may be manipulated. It also provides a conduit for the liquid insecticide conveyed thereto through the flexible tubing 5 attached to the rear end thereof by the clamp 7. This rear end of the main stem 6 may also be provided with a cut-off valve 8 to prevent the flow and consequent waste of insecticide when the device is not being used.

To the forward end of the stem or shaft or handle 6 I attach a T-coupling 9, into the intermediate stem of which is firmly threaded the forward end of the stem or handle 6 and into the outward lateral branches of which are threaded respectively the ends of the arms or branches 10—10. These arms or branches 10—10 at their upper ends 11—11, where they are threaded into the T-coupling 9, extend outwardly radially from the axis of the main stem in opposite directions, they are then provided with downwardly extending portions 12 diverging from each other gradually, and are then provided with inwardly curved portions 13—13, the curve being sufficient to cause the free ends 14—14 of the arms or branches 10 to be upwardly directed to a point or region in a vertical plane midway between the free ends 14, and below the T-coupling 9. The said free ends 14—14 are each provided with spray nozzles 15—15 which together discharge substantially converging streams of the spray or mist of a liquid insecticide to a focal region 16, midway between said nozzles 15—15 and substantially below the T-coupling 9.

The arms or branches 10—10 are preferably provided with a slight forwardly extending reach or rake (as is clearly shown in Figs. 1 and 3) in order that the focal region to which the jets or sprayers 15 are directed may be a little in advance of the forward end of the main stem 7 and its coupling as well as horizontally a little below them. These arms or branches 10—10 are adjustably mounted with respect to the main stem 6 and its T-coupling. The ends 11—11 of the arms 10—10 are screw-threaded into the T-coupling 9 and are provided with locking nuts 17—17. These nuts 17—17 may be loosened. The arms or branches 10—10 swung forwardly or rearwardly to the desired position and then may be held in that adjusted position by tightening up on the locking nuts 17.

From the foregoing it will be apparent that the arms or the branches 10—10 are complemental to each other and when mounted on the end of the main stem or handle 6 in the T-coupling 9 they may be adjusted to form, generally speaking, a symmetrical heart-shaped figure when looked at from the front, as appears in Fig. 2, being thus adapted to extend downwardly around and outside of the plant 18, clear of it, but straddling it, the nozzles 15 being under the plant close to the ground and directing convergent streams of liquid insecticide upwardly against the underside of the foliage of the plant.

In order to forcibly drive a supplemental stream of mist or insecticide against the upper surfaces of the leaves, I may provide the T-coupling 9 with a tapped hole 19 and screwed thereinto, a stem 20 preferably a relatively short goose-neck to the end of which is attached a smaller sprayer or jet 21, preferably also directed so as to discharge a stream or spray of insecticide downwardly and slightly forwardly. This jet 21 may, however, be dispensed with in many instances and when not used the hole 19 should be stopped with a plug or bolt 22, as shown in the modified construction illustrated in Fig. 5.

In using my device, the operator, with the pressure reservoir 1 strapped to his back, as shown in Fig. 1, maintains the desired pressure in the reservoir 1 by moving the pump handle 3 upwardly and downwardly with his right hand as he walks between the rows of plants 18. The cut-off valve being opened, and with my improved spraying implement, in his left hand, he carries it down or along the row of plants 18 with the arms or branches 10 straddling the row of plants and the nozzles 15 close to the ground below the foliage of the plant and directed convergingly upwardly. He may walk rather rapidly for the discharge of the spray or mist of liquid insecticide from the nozzles 15 is rapid and efficient. The streams forcibly strike against the undersides of the foliage of the plant from opposite sides as the streams progress toward the focal region 16. Thereafter the confluent streams of mist or spray are impelled, in the main, upwardly vertically through the foliage to a level above the plant.

The pressure in the tank 1 is preferably maintained sufficient to drive a substantial portion of the spray or mist from the lower nozzles 15 upwardly through the plants 18 to a plane or point above the plant, where the particles lose their vertical velocity and fall back like a fine rain or mist vertically downwardly over the upper surfaces of the leaves of the plant.

In many instances, the two lower nozzles 15, operated as described above, are ample to supply enough of the insecticide to substantially cover both the under and the upper surfaces of the leaves and to destroy insect life thereon, but where the insecticide is weak, or great quantities are required to rid the plants of the pests thereon, the supplemental nozzle 21 may be added and used.

But the use of the nozzle 21 is supplemental and secondary. Whether the foliage be dense or sparse, the pressure of the material issuing from the lower jets 15 should be sufficient to drive a substantial part of the liquid insecticide to points above or over the plant. If, however, that is insufficient the operator may attach the nozzle 21 to apply the insecticide directly to the upper surfaces of the leaves, but the quantity required to be discharged by the nozzle 21 is comparatively small, should not be great enough to substantially reduce the pressure of the insecticide in the branches or arms 10.

In driving the spray or mist insecticide thus upwardly through the plant, the insects, which are not reached by a downwardly application of the insecticide to the upper surface of the leaves, will be destroyed, as well as those on the upper surfaces of the leaves. In other words, the operator easily thoroughly covers both the lower and upper surface of the foliage of the plant with an insecticide. And this result is accomplished very efficiently and rapidly by a workman who rather rapidly walks the length of a row applying insecticide to the leaves in the manner above described and in the manner illustrated in Fig. 1. This device also makes unnecessary the services of an assistant to turn over the branches or leaves with a stick or other tool in order that the laborer who is applying the spray may direct the spray to the undersides of the leaves, for by applying sufficient pressure to impel some of the insecticide to points above the tops of the plants the leaves are better agitated and moved, laterally and vertically sufficient to cause the spray in direct contact with the underside of substantially all of the foliage of the plant, and that which gravitationally falls is caught on the upper surfaces of the leaves. The device effects a remarkable saving both in labor and in time, providing a cheap efficient apparatus for effectively ridding growing plants of those pests which protect themselves by remaining on the undersides of the leaves and rapidly destroy them.

By directing the discharge of the stream or spray of the insecticide from the nozzles slightly forwardly—that is to say, by giving to the upwardly turned ends 14 and to the stem 20 a forward rake, two objects are accomplished, namely, the sprayed liquid is applied to the plant and substantially settles on the plant before the operator practically arrives at the plant so that the sprayed insecticide does not come very much into contact with the body of the operator and the operator does not take the insecticide into his lungs by breathing it. The other object which is accomplished is that the discharge from these nozzles penetrates thoroughly into and between the leaves and into the flowers of the plant. A leaf which is receiving a direct discharge from a sprayer or jet 15 does not prevent the spray from reaching the underside of a leaf directly above it as it might be if this rake were to be omitted. This also applies as well, but conversely, to the upper jet 21, wherein the slight forward rake also enables the spray therefrom to more completely and easily penetrate into all the foliage and to deposit the liquid on the upper surfaces of all the leaves and within the upwardly bending flowers on the plant.

Having thus described my invention, what I claim and desire to protect by Letters Patent of the United States is:

1. A device for spraying a liquid insecticide against the undersides of the leaves of growing plants, which comprises in combination a light rigid tubular main stem, a pair of complemental symmetrically disposed tubular arms connected to said main stem and extending therefrom first laterally outwardly from said stem in diametrically opposite directions, then curving downwardly divergingly and then curving inwardly toward each other and terminating in upwardly convergingly directed ends, to pass over and around and to straddle the plant to be sprayed and spraying nozzles respectively mounted, one on each of said ends, to direct the discharge of fluid delivered thereto from said stem and branches, upwardly to a focal region below the level of the points at which said arms are connected to said stem, and against the undersides of the leaves.

2. A device for spraying a liquid insecticide against the undersides of the leaves of growing plants, which comprises in combination a light rigid tubular main stem, a pair of complemental symmetrically disposed tubular arms connected to the end of said main stem and extending therefrom first laterally outwardly from said stem in diametrically opposite directions, then curving downwardly divergingly from each other and then curving inwardly toward each other and terminating in upwardly and convergingly forwardly directed ends, the arms being adapted to straddle and substantially surround the plant to be treated and spray nozzles respectively mounted, one on each of said ends, to direct the discharge of fluid delivered from said arms upwardly and slightly forwardly to a focal region which is below the level of the points at which said arms are connected to said stem whereby, after the confluence of the discharges of said fluid to said focal region, the fluid is impelled substantially vertically from said focal region.

3. A device for spraying a liquid insecticide against the undersides of the leaves of growing plants, which comprises in combination a light rigid tubular main stem, a T-shaped coupling rigidly mounted on the end thereof, a pair of complemental symmetrically disposed tubular arms threaded into the alined openings of said T-coupling, said arms extending from said coupling first outwardly in diametrically opposite directions, then curving downwardly divergingly and then curving inwardly toward each other and terminating in upwardly convergingly directed ends, said arms straddling and substantially surrounding the plant to be treated, spray nozzles respectively mounted, one on each of said ends, to direct the discharge the fluid delivered thereto from said arms upwardly to a focal region between said arms and above said jets and below the level of the points at which said arms are connected to said stem, and lock nuts on said arms adjacent said coupling to lock said arms in fixed relationship with respect to said stem and when loosened, to permit of the angular adjustment of said arms with respect to said stem and in respect to each other.

4. A device for spraying a liquid insecticide against the leaves of growing plants, which comprises in combination a light rigid tubular main stem and a pair of complemental symmetrically disposed tubular arms connected to the end of said main stem and extending therefrom first laterally outwardly in diametrically opposite directions, then curving downwardly, divergingly and then curving inwardly toward each other and terminating in upwardly convergingly directed ends, to substantially straddle the plant spray nozzles respectively mounted, one on each of said ends, to direct the discharge of fluid delivered thereto from said stem and arms upwardly to a focal region which is below the level of the points at which said arms are connected to said stem, and a supplemental spray nozzle connected to the forward end of said main stem and operative to apply said liquid directly against the upper surfaces of the leaves of said plant.

5. A device for spraying a liquid insecticide against the leaves of growing plants, which comprises in combination, a light rigid tubular main stem and a pair of complemental symmetrically disposed tubular arms adjustably connected to the end of said main stem and extending therefrom first laterally outwardly in diametrically opposite directions, then curving downwardly convergingly and then curving inwardly toward each other and terminating in upwardly convergingly directed ends, to substantially straddle said plant, spray nozzles respectively mounted, one on each of said ends, to direct the discharge of fluid delivered therefrom upwardly and forwardly to a focal region below the level of the points at which said arms are connected to said stem, and a supplemental spray nozzle also connected to the forward end of said main stem and directed downwardly and slightly forwardly into the foliage of said plant and against the upper surfaces of the leaves thereof.

RUDOLPH GRETSCHEL.